(12) United States Patent
Casciano et al.

(10) Patent No.: US 7,124,104 B2
(45) Date of Patent: Oct. 17, 2006

(54) METHODS AND SYSTEMS FOR IMPLEMENTING A PROFITABILITY MODEL

(75) Inventors: Anthony G. Casciano, Norwalk, CT (US); Karen L. Savoca, Newtown, CT (US); Steven Sanicola, Southbury, CT (US)

(73) Assignee: GE Corporate Financial Services, Inc., Norwalk, CT (US)

( * ) Notice: Subject to any disclaimer, the term of this patent is extended or adjusted under 35 U.S.C. 154(b) by 0 days.

(21) Appl. No.: 09/681,408

(22) Filed: Mar. 30, 2001

(65) Prior Publication Data
US 2002/0143679 A1 Oct. 3, 2002

(51) Int. Cl.
*G06Q 40/00* (2006.01)
(52) U.S. Cl. .......................... 705/36; 705/35
(58) Field of Classification Search .................. 705/35, 705/36
See application file for complete search history.

(56) References Cited

U.S. PATENT DOCUMENTS

| | | | |
|---|---|---|---|
| 4,975,840 A * | 12/1990 | DeTore et al. ................ 705/4 |
| 5,523,942 A * | 6/1996 | Tyler et al. ................... 705/34 |
| 5,557,515 A | 9/1996 | Abbruzzese et al. |
| 5,684,945 A | 11/1997 | Chen et al. |
| 5,692,181 A | 11/1997 | Anand et al. |
| 5,710,900 A | 1/1998 | Anand et al. |
| 5,721,903 A | 2/1998 | Anand et al. |
| 5,797,115 A * | 8/1998 | Fuller ......................... 702/186 |
| 5,799,287 A * | 8/1998 | Dembo ........................ 705/36 |
| 5,911,134 A | 6/1999 | Castonguay et al. |
| 5,913,206 A | 6/1999 | Chaudhuri et al. |
| 5,913,207 A | 6/1999 | Chaudhuri et al. |
| 6,026,382 A | 2/2000 | Kalthoff |
| 6,026,397 A | 2/2000 | Sheppard |
| 6,073,104 A * | 6/2000 | Field ........................... 705/1 |
| 6,112,190 A | 8/2000 | Fletcher et al. |
| 6,144,945 A | 11/2000 | Garg et al. |
| 6,148,293 A * | 11/2000 | King ........................... 705/35 |
| 6,182,079 B1 | 1/2001 | Lenzie |
| 6,192,347 B1 | 2/2001 | Graff |
| 6,205,447 B1 | 3/2001 | Malloy |
| 6,223,171 B1 | 4/2001 | Chaudhuri et al. |
| 6,249,775 B1 | 6/2001 | Freeman et al. |
| 6,401,079 B1 * | 6/2002 | Kahn et al. ................... 705/30 |

* cited by examiner

*Primary Examiner*—Alain L. Bashore
(74) *Attorney, Agent, or Firm*—Armstrong Teasdale LLP

(57) ABSTRACT

A method for operating a computer to enhance profitability of a portfolio using a profitability model includes prompting a user to enter at least one workload driver for the portfolio, prompting a user to enter a trigger level for each entered workload driver and allocating portfolio and underwriting expenses, based upon workload drivers and their trigger levels. In an exemplary embodiment the method is implemented using a server and a database to evaluate deal economics within portfolios based on workload requirements relative to market pricing levels. Workload drivers and trigger levels cause the model to be activity based rather than average cost based.

26 Claims, 18 Drawing Sheets

| DEAL WORKLOAD DRIVER INPUTS |
|---|

/ 100

| CUSTOMER | Customer Name |
| --- | --- |
| REGION | |
| SALES / PORTFOLIO REP | |
| U.S. or Canadian Deal | US | Select "US" (for U.S. Tax Rate) or "C" (for Canadian Tax Rate). |
| Cross-Sell Deal | No | If "Yes" for Cross-Sell Deal, Select Cross-Sell Source; If "No" Leave Blank. |
| Cross-Sell Source | | |

Required Inputs:   (Select Inputs From Drop Down Menus - All 11 Must be Completed)

1) What is the collateral performance? _____

2) What is the excess availability after trade clean-up? _____

3) Are the books & records (systems & processes) adequate? _____

4) What is the risk classification? _____

5) How many agings are in the borrowing base? _____

6) What is the frequency of borrowing? _____

7) What is the frequency of borrowing base reporting? _____

8) Is it a co-borrower structure? _____

9) What is the fixed charge coverage? _____

10) Is this a 1st time ABL borrower? (i.e., level of mgmt experience) _____

11) Is there an EX-IM bank guarantee? _____

FIG. 6

| CUSTOMER | Customer Name | | Deal Category | ABL | |
|---|---|---|---|---|---|
| REGION | 0 | | KMV Rating | | Valid Inputs: AAA, AA, A, BBB, BB, B, CCC, CC, C, or D |
| SALES/PORTFOLIO | | | Portfolio Rollover | | Valid Inputs: No or Yes |
| CASE | Total Deal Inputs | | | | |
| U.S. or Canadian Deal | If "C", Must Convert All Inputs To US Dollars Using Current Exchange Rate | | | | |

If you have a question, please call: Val Bernardi  8*228-8548

*The information entered on this INPUT TAB will flow automatically into TAB's 1-4 of the model. Enter the Commitment amounts, outstanding and amortization on a total deal basis. Then enter the CF total hold amount in cell C25. The model will automatically calculate the exact CF percentage assuming the hold amount is on a pro-rata basis for all the deal tranches. If the deal is not pro-rata you will need to override the formulas in the CF percentage column and enter the actual percentage to be held for each deal tranche.*

| | Commitment Amount | CF Percentage % | Term (Months) | Index | Index Rate | Adder | Fixed (F)/ Variable (V) |
|---|---|---|---|---|---|---|---|
| REVOLVER (Less L/Cs) | 0 | 0.00% | 0 | CP | 0.00% | 0.00% | V |
| TERM A | 0 | 0.00% | 0 | CP | 0.00% | 0.00% | V |
| TERM B | 0 | 0.00% | 0 | CP | 0.00% | 0.00% | V |
| TERM C | 0 | 0.00% | 0 | CP | 0.00% | 0.00% | V |
| TERM D | 0 | 0.00% | 0 | CP | 0.00% | 0.00% | V |
| CAPEX | Y | 0.00% | 0 | | | | |
| 360 Day Adder | | | | | | | |
| L/C FACILITY | | | | | Rate: 0.00% | | |
| PREFERRED STOCK | | | | | Coupon: 0.00% | | |

| PREFERRED STOCK | 0 | *Do not include any Preferred Stock in this CF hold amount since the model assumes it will all be held by CF* |

| FEES | Revolver | Term A | Term B | Term C | Term D | CAPEX | Pref Stock | L/Cs |
|---|---|---|---|---|---|---|---|---|
| Commitment Fee | 0.00% | 0.00% | 0.00% | 0.00% | 0.00% | 0.00% | 0.00% | 0.00% |
| Closing Fee | 0.00% | 0.00% | 0.00% | 0.00% | 0.00% | 0.00% | 0.00% | 0.00% |
| Unused Line Fee | 0.00% | | | | | 0.00% | | |
| Audit Fees Recovered (Y/N) | Y | | | | | | | |
| Legal Expense | 0 | | | | | | | |
| Annual Fees | 0 | Month | Month | | | | | |
| One Time Payments | 0 | 0 | 0 | Month | 0 | | | |
| Collection Days | 0 | Avg Annual Collections | | 0 | | | | |

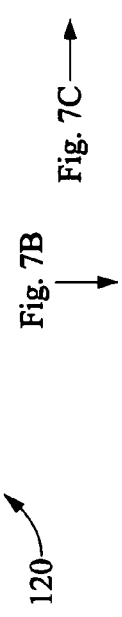

| | YR. 1 | YR. 2 | YR. 3 | YR. 4 | YR. 5 | YR. 6 | YR. 7 | YR. 8 |
|---|---|---|---|---|---|---|---|---|
| AVERAGE OUTSTANDING | | | | | | | | |
| REVOLVER | 0 | 0 | 0 | 0 | 0 | 0 | 0 | 0 |
| L/C | 0 | 0 | 0 | 0 | 0 | 0 | 0 | 0 |
| CAPEX | 0 | 0 | 0 | 0 | 0 | 0 | 0 | 0 |

AMORTIZATION SCHEDULE

Frequency: Monthly *Amort for the Preferred Stock investment will automatically be entered as a bullet maturity. Manually change if necessary* (Monthly, Quarterly, Biannual, Annual)

| | YR. 1 | YR. 2 | YR. 3 | YR. 4 | YR. 5 | YR. 6 | YR. 7 | YR. 8 |
|---|---|---|---|---|---|---|---|---|
| TERM A | 0 | 0 | 0 | 0 | 0 | 0 | 0 | 0 |
| TERM B | 0 | 0 | 0 | 0 | 0 | 0 | 0 | 0 |
| TERM C | 0 | 0 | 0 | 0 | 0 | 0 | 0 | 0 |
| TERM D | 0 | 0 | 0 | 0 | 0 | 0 | 0 | 0 |
| PREFERRED STOCK | 0 | | | | | | | |

*The outplacement amounts below are automatically calculated assuming CF is agenting the deal. If the deal is a participation transaction then the amounts in the "Amount Placed" column will need to be replaced with zeros. The Fee Rake and Fee Skim percentages must always be entered manually.*

OUTPLACEMENT ASSUMPTIONS

| | Amount Placed | Fee Rake | Rate Skim |
|---|---|---|---|
| REVOLVER (Less L/Cs) | 0 | 0.00% | 0.00% |
| TERM A | 0 | 0.00% | 0.00% |
| TERM B | 0 | 0.00% | 0.00% |
| TERM C | 0 | 0.00% | 0.00% |
| TERM D | 0 | 0.00% | 0.00% |
| CAPEX | 0 | 0.00% | 0.00% |
| L/C FACILITY | 0 | 0.00% | 0.00% |

*Note:*
Fee Rake = CF's Skim on the Closing/Commitment Fee
Rate Skim = CF's Skim on the Adder

| Alternate Pricing #1 | | Alternate Pricing #2 | |
|---|---|---|---|
| Index | Adder | Index | Adder |
| CP | 0.00% | CP | 0.00% |
| CP | 0.00% | CP | 0.00% |
| CP | 0.00% | CP | 0.00% |
| CP | 0.00% | CP | 0.00% |
| CP | 0.00% | CP | 0.00% |
| CP | 0.00% | CP | 0.00% |

Fig. 7A

| | | Section In WSJ you will find rates: |
|---|---|---|
| INPUT Rates (from WSJ) | 0.00% | |
| US Prime | 0.00% | WSJ-Money Rates/Prime Rate |
| LIBOR | 0.00% | WSJ-Money Rates/One Month Rate |
| CP | 0.00% | WSJ-Money Rates/30 Day - H15 CP Rate |
| U.S. Treasury (*) | 0.00% | WSJ-Bond Market Data Bank - Yields |
| Canadian Prime | 0.00% | WSJ-Money Rates/Foreign Prime Rates |
| Canadian BA(**) (From Fin | | |

(*) To enter a Fixed Rate tranche of debt into the model:

-Input "Treasury" In the Index column
-Look up in the WSJ the current yield on U.S. Treasury Notes whose maturity
is the closest to the maturity (or avg. life) of the fixed tranche of debt.
-Update the GECC Money Cost rates in calls V12 thru V21

Since the return on Preferred Stock is fixed, you must update the GECC Money Cost rates.

(**) For CDBA deduct 10Bpt from the Money cost rate

Fig. 7B

A "Call Finance" message in this area means the amortization amounts entered do not add up to the total commitment. Ignore only if the remaining amount is assumed to be a bullet payment due at the end of term or if the full commitment amount is a bullet payment. If the total commitment has only one term loan and it is a bullet payment, change the amortization frequency to "Annual" and input the full payment in the appropriate year.

FIG. 7C

CUSTOMER Customer Name 0
REGION
SALES/PORTFOLIO Fully Funded - Post Syndication
CASE
U.S. or Canadian Deal US
Equity Deals Exit Multiple 0

| | |
|---|---|
| Deal Category | ABL |
| KMV Rating | 0 |
| Portfolio | 0 |

| | Commitment Amount | Term (Months) | Index | Index Rate | Adder | Fixed (F)/ Variable (V) |
|---|---|---|---|---|---|---|
| REVOLVER (Less L/Cs) | 0 | 0 | CP | 0.00% | 0.00% | V |
| TERM A | 0 | 0 | CP | 0.00% | 0.00% | V |
| TERM B | 0 | 0 | CP | 0.00% | 0.00% | V |
| TERM C | 0 | 0 | CP | 0.00% | 0.00% | V |
| TERM D | 0 | 0 | CP | 0.00% | 0.00% | V |
| CAPEX | 0 | | | | | |
| 360 Day Adder | Y | | | | | |
| L/C FACILITY | 0 | | | Rate: 0.00% | | |
| PREFERRED STOCK | 0 | | | Coupon: 0.00% | | |
| WARRANTS Value: | 0 | | | Multiple: 0.0 | | |
| COMMON STOCK INVEST | 0 | | | Multiple: 0.0 | | |
| Warrants - Only IRR: | N/A | Common Stock - Only IRR: N/A | | | Capital Gain: 0 | |

FEES

| | Revolver | Term A | Term B | Term C | Term D | CAPEX | Pref Stock | L/Cs |
|---|---|---|---|---|---|---|---|---|
| Commitment Fee | 0.00% | 0.00% | 0.00% | 0.00% | 0.00% | 0.00% | 0.00% | 0.00% |
| Closing Fee | 0.00% | 0.00% | 0.00% | 0.00% | 0.00% | 0.00% | 0.00% | 0.00% |
| Unused Line Fee | 0.00% | | | | | 0.00% | | |
| Audit Fees Recovered (Y/N) | Y | | | | | | | |
| Legal Expense | 0 | Month | Month | Month | Month | | | |
| Annual Fees | 0 | 0 | 0 | 0 | 0 | | | |
| One Time Payments | 0 | | | | | | | |
| Collection Days | 0 | Avg Annual Collections | 0 | | | | | |

| | YR. 1 | YR. 2 | YR. 3 | YR. 4 | YR. 5 | YR. 6 | YR. 7 | YR. 8 |
|---|---|---|---|---|---|---|---|---|
| SECURITIZATION CONTRIBUTED VALUE | 0 | 0 | 0 | 0 | 0 | 0 | 0 | 0 |
| SECURITIZATION OPERATING EXPENSES | 0 | 0 | 0 | 0 | 0 | 0 | 0 | 0 |

| | | | |
|---|---|---|---|
| Total Commitment | 0 | Weighted Term (in Months) | #DIV/01 |
| ANI | #DIV/01 | Weighted Term (in Years) | #DIV/01 |
| Total Net Income | (151,125) | Average Annual Net Income | #DIV/01 |
| Total Contributed Value | 0 | Average Annual Contributed Value | #DIV/01 |
| CV% | #DIV/01 | Conbined Utilization (Revolver - L/C) | #DIV/01 |
| ROI | #DIV/01 | Utilization % (Cap Ex Line) | N/A |
| ROE (High L/C Usage or Sec.) | N/A | | |
| TOTAL DEAL FEE BREAKOUT | | | |
| Net Interest Income | 0 | Weighted Syndication Fee Rake | N/A |
| Collection Days | 0 | Unused Fees | 0 |
| L/C Fees | 0 | All Other Fees | 0 |

Fig. 8A ←

| Alternate Pricing #1 | | Alternate Pricing #2 | |
|---|---|---|---|
| Index | Adder | Index | Adder |
| CP | 0.00% | CP | 0.00% |
| CP | 0.00% | CP | 0.00% |
| CP | 0.00% | CP | 0.00% |
| CP | 0.00% | CP | 0.00% |
| CP | 0.00% | CP | 0.00% |
| CP | 0.00% | CP | 0.00% |

Rates:
| | |
|---|---|
| US Prime | 0.00% |
| LIBOR | 0.00% |
| CP | 0.00% |
| Treasury | 0.00% |
| Canadian Prime | 0.00% |
| Canadian BA (From Finance) | 0.00% |

| | | | |
|---|---|---|---|
| GE Money Cost | | | |
| Revolver | 0.00% | | |
| Term A | 0.00% | | |
| Term B | 0.00% | | |
| Term C | 0.00% | | |
| Term D | 0.00% | Preferred Stock | 0.00% |
| CAPEX | 0.00% | Common Stock | 0.00% |

| DEAL SUMMARY | Yr. 1 | Yr. 2 | Yr. 3 | Yr. 4 | Yr. 5 | Yr. 6 | Yr. 7 | Yr. 8 | TOTAL | AN% | ROI% |
|---|---|---|---|---|---|---|---|---|---|---|---|
| REVOLVER BALANCE | 0 | 0 | 0 | 0 | 0 | 0 | 0 | 0 | 0 | #DIV/01 | #DIV/01 |
| TERM A BALANCE | 0 | 0 | 0 | 0 | 0 | 0 | 0 | 0 | 0 | #DIV/01 | #DIV/01 |
| TERM B BALANCE | 0 | 0 | 0 | 0 | 0 | 0 | 0 | 0 | 0 | #DIV/01 | #DIV/01 |
| TERM C BALANCE | 0 | 0 | 0 | 0 | 0 | 0 | 0 | 0 | 0 | #DIV/01 | #DIV/01 |
| TERM D BALANCE | 0 | 0 | 0 | 0 | 0 | 0 | 0 | 0 | 0 | #DIV/01 | #DIV/01 |
| CAPEX BALANCE | 0 | 0 | 0 | 0 | 0 | 0 | 0 | 0 | 0 | #DIV/01 | #DIV/01 |
| PREFERRED STOCK | 0 | 0 | 0 | 0 | 0 | 0 | 0 | 0 | 0 | #DIV/01 | #DIV/01 |
| COMMON STOCK | 0 | 0 | 0 | 0 | 0 | 0 | 0 | 0 | 0 | #DIV/01 | #DIV/01 |
| TOTAL INVESTMENT | 0 | 0 | 0 | 0 | 0 | 0 | 0 | 0 | 0 | #DIV/01 | #DIV/01 |
| AVERAGE L/C | 0 | 0 | 0 | 0 | 0 | 0 | 0 | 0 | 0 | #DIV/01 | #DIV/01 |
| | | | | | | | | | | | |
| INCOME | | | | | | | | | | | |
| Interest Income (Total) | 0 | 0 | 0 | 0 | 0 | 0 | 0 | 0 | 0 | #DIV/01 | #DIV/01 |
| Revolver | 0 | 0 | 0 | 0 | 0 | 0 | 0 | 0 | 0 | #DIV/01 | #DIV/01 |
| Term A | 0 | 0 | 0 | 0 | 0 | 0 | 0 | 0 | 0 | #DIV/01 | #DIV/01 |
| Term B | 0 | 0 | 0 | 0 | 0 | 0 | 0 | 0 | 0 | #DIV/01 | #DIV/01 |
| Term C | 0 | 0 | 0 | 0 | 0 | 0 | 0 | 0 | 0 | #DIV/01 | #DIV/01 |
| Term D | 0 | 0 | 0 | 0 | 0 | 0 | 0 | 0 | 0 | #DIV/01 | #DIV/01 |
| CAPEX | 0 | 0 | 0 | 0 | 0 | 0 | 0 | 0 | 0 | #DIV/01 | #DIV/01 |
| Outplacement | 0 | 0 | 0 | 0 | 0 | 0 | 0 | 0 | 0 | #DIV/01 | #DIV/01 |
| Dividends | 0 | 0 | 0 | 0 | 0 | 0 | 0 | 0 | 0 | #DIV/01 | #DIV/01 |
| Collection Days | 0 | 0 | 0 | 0 | 0 | 0 | 0 | 0 | 0 | #DIV/01 | #DIV/01 |
| L/C Fees | 0 | 0 | 0 | 0 | 0 | 0 | 0 | 0 | 0 | #DIV/01 | #DIV/01 |
| Commitment Fees | 0 | 0 | 0 | 0 | 0 | 0 | 0 | 0 | 0 | #DIV/01 | #DIV/01 |
| Closing Fee | 0 | 0 | 0 | 0 | 0 | 0 | 0 | 0 | 0 | #DIV/01 | #DIV/01 |
| Outplacement Fee | 0 | 0 | 0 | 0 | 0 | 0 | 0 | 0 | 0 | #DIV/01 | #DIV/01 |
| Unused Line Fees | 0 | 0 | 0 | 0 | 0 | 0 | 0 | 0 | 0 | #DIV/01 | #DIV/01 |
| Annual Fees | 0 | 0 | 0 | 0 | 0 | 0 | 0 | 0 | 0 | #DIV/01 | #DIV/01 |
| Additional Payments | 0 | 0 | 0 | 0 | 0 | 0 | 0 | 0 | 0 | #DIV/01 | #DIV/01 |
| Securitization CV | 0 | 0 | 0 | 0 | 0 | 0 | 0 | 0 | 0 | #DIV/01 | #DIV/01 |
| Warrant Realization | 0 | 0 | 0 | 0 | 0 | 0 | 0 | 0 | 0 | #DIV/01 | #DIV/01 |
| Common Stock | 0 | 0 | 0 | 0 | 0 | 0 | 0 | 0 | 0 | #DIV/01 | #DIV/01 |
| TOTAL INCOME | 0 | 0 | 0 | 0 | 0 | 0 | 0 | 0 | 0 | #DIV/01 | #DIV/01 |

Customer Name
Expected Case - Post Syndication

| | | | | | | | | | |
|---|---|---|---|---|---|---|---|---|---|
| MONEY COST (Total) | 0 | 0 | 0 | 0 | 0 | 0 | 0 | 0 | |
| REVOLVER | 0 | 0 | 0 | 0 | 0 | 0 | 0 | 0 | #DIV/01 |
| TERM A | 0 | 0 | 0 | 0 | 0 | 0 | 0 | 0 | #DIV/01 |
| TERM B | 0 | 0 | 0 | 0 | 0 | 0 | 0 | 0 | #DIV/01 |
| TERM C | 0 | 0 | 0 | 0 | 0 | 0 | 0 | 0 | #DIV/01 |
| TERM D | 0 | 0 | 0 | 0 | 0 | 0 | 0 | 0 | #DIV/01 |
| CAPEX | 0 | 0 | 0 | 0 | 0 | 0 | 0 | 0 | #DIV/01 |
| PREFERRED STOCK | 0 | 0 | 0 | 0 | 0 | 0 | 0 | 0 | #DIV/01 |
| COMMON STOCK | 0 | 0 | 0 | 0 | 0 | 0 | 0 | 0 | |
| | | | | | | | | | |
| CONTRIBUTED VALUE | 0 | 0 | 0 | 0 | 0 | 0 | 0 | 0 | #DIV/01 |
| | | | | | | | | | |
| OPERATING EXPENSE | | | | | | | | | |
| Origination | 250,000 | 0 | 0 | 0 | 0 | 0 | 0 | 250,000 | #DIV/01 |
| Underwriting | 0 | 0 | 0 | 0 | 0 | 0 | 0 | 0 | #DIV/01 |
| Portfolio | 0 | 0 | 0 | 0 | 0 | 0 | 0 | 0 | #DIV/01 |
| Overhead | 0 | 0 | 0 | 0 | 0 | 0 | 0 | 0 | #DIV/01 |
| Corporate A&A | 0 | 0 | 0 | 0 | 0 | 0 | 0 | 0 | #DIV/01 |
| Legal Expense | 0 | 0 | 0 | 0 | 0 | 0 | 0 | 0 | #DIV/01 |
| Cross - Sell | 0 | 0 | 0 | 0 | 0 | 0 | 0 | 0 | #DIV/01 |
| External Capital Markets | 0 | 0 | 0 | 0 | 0 | 0 | 0 | 0 | #DIV/01 |
| Securitization Expense | 0 | 0 | 0 | 0 | 0 | 0 | 0 | 0 | #DIV/01 |
| Loss Provision | 0 | 0 | 0 | 0 | 0 | 0 | 0 | 0 | #DIV/01 |
| Audit Expenses | 0 | 0 | 0 | 0 | 0 | 0 | 0 | 0 | #DIV/01 |
| TOTAL OP EXPENSE | 250,000 | 0 | 0 | 0 | 0 | 0 | 0 | 250,000 | #DIV/01 |
| | | | | | | | | | |
| TOTAL EXPENSES | 250,000 | 0 | 0 | 0 | 0 | 0 | 0 | 250,000 | #DIV/01 |
| | | | | | | | | | |
| PRE-TAX INCOME | (250,000) | 0 | 0 | 0 | 0 | 0 | 0 | (250,000) | #DIV/01 |
| TAXES | (98,875) | 0 | 0 | 0 | 0 | 0 | 0 | (98,875) | #DIV/01 |
| NET INCOME | (151,125) | 0 | 0 | 0 | 0 | 0 | 0 | (151,125) | #DIV/01 |
| | | | | | | | | | |
| CASH FLOWS | 0 | (151,125) | 0 | 0 | 0 | 0 | 0 | 0 | (151,125) |

| Region | Acct. Mgr. | Deal | Coll. Monitoring | Client Reqs. | Workload | Risk | Work/Risk |
|---|---|---|---|---|---|---|---|
| E | Smith | Steel Co. | 2.45 | 0.80 | 1.90 | 2.50 | Mod/High |
| MW | Jones | Paper Co. | 2.55 | 1.30 | 2.13 | 2.03 | High/High |
| S | White | Drug Co. | 2.00 | 0.50 | 1.50 | 0.60 | Mod/Low |
| W | Black | Lumber Co. | 2.00 | 1.00 | 1.67 | 1.80 | Mod/Mod |

Strategic Relationship Review

Fig. 12B →

Customer Name: _____
Maturity Date: _____

| Goals | Specific Objectives |
|---|---|
| Customer Visitation <br> Determine Visitation Schedule & Objectives | • <br> • |
| Senior Management Contact <br> Determine senior management calling strategy & objectives. | • <br> • |
| Value Added Services <br> Plans for cross selling other GE / GE Capital products & services. | • <br> • |
| Opportunities For Performance Based Pricing <br> Determine whether a performance based pricing strategy is appropriate. | • <br> • |
| Flexibility In Structure / Reporting <br> Determine whether increased flexibility is warranted due to improved financial & collateral performance. | • <br> • |
| Incremental CV$ <br> Identify opportunities to generate incremental CV$ through WAM fees, contract extensions & incremental new business. | • <br> • |
| Responsiveness <br> Outline customer requirement & establish objectives to meet/exceed expectation. | • <br> • |
| Retention Strategy <br> Understand customer CTQ's & develop strategy to retain customer. | • <br> • |

Overall Performance Rating

| Did Not Meet Expectations | Met Expectations | Exceeded Expectations |
|---|---|---|
| 1 | 2  3 | 4  5 |

Account Manager: _____
Date: _____

|  | Achievements | Assessment* |
|---|---|---|
|  |  |  |
|  |  |  |
|  |  |  |
|  |  |  |
|  |  |  |
|  |  |  |
|  |  |  |
|  |  |  |

*Performance Assessment Is The Responsibility Of The Region Manager & Portfolio Manager With Input From The SCO Where Appropriate.

METHODS AND SYSTEMS FOR IMPLEMENTING A PROFITABILITY MODEL

BACKGROUND OF INVENTION

This invention relates generally to profitability, and, more specifically to methods and systems used to enhance profitability on accounts, for example, loan accounts.

There are certain fixed and variable expenses for a lender doing business that are unavoidable as a cost of doing business. In the simplest of known systems, the expenses are simply calculated as a percentage of the transaction. However, most fixed expenses are constant no matter the size of the transaction. A potential customer could be discouraged from seeking a business opportunity with a lender who calculates fixed expenses as a percentage of the transaction value. Lenders and customers both realize that there are expenses incurred in conducting business. For large transactions, customers realize that a lender is going to incur additional expenses in both an approval cycle and in a maintenance cycle through the life of the transaction. How the lender passes the expenses on to the customer certainly affects the customer in, for example, up front expenses and, incurred interest and fees, but the passing of expenses also affects the lender. For example, the impact to the lender is whether the fixed income from a transaction is greater than the fixed expense of the transaction, which affects profitability.

Another impact to profitability are the activities and associated workload engaged in by employees of lenders in researching, underwriting, closing and servicing a transaction. Some of these expenses are variable depending on the size of the deal. Further, some of the activities are greatly reduced, eliminated or magnified, depending on the size and/or structuring of the deal.

SUMMARY OF INVENTION

In one aspect, there is provided a method for operating a computer to enhance profitability of a portfolio using a profitability model. The method for operating the computer comprises the steps of prompting a user to enter at least one workload driver for the portfolio, prompting a user to enter a trigger level for each entered workload driver, prompting a user to enter a weight for each trigger level and allocating portfolio and underwriting expenses, based upon workload drivers and their trigger levels.

In another aspect, a database is provided which comprises data corresponding to workload drivers and related trigger levels for the workload drivers. In addition the database comprises data corresponding to input and feedback regarding the deal.

In yet another aspect, a system is provided that is configured to evaluate deal economics within portfolios based on workload requirements. The system for evaluating deal economics includes a database comprising data corresponding to workload drivers and related trigger levels for each deal and a server configured to prompt users to select trigger levels for each designated workload driver when entering deal data.

In still another aspect, a method for assessing profitability of a portfolio of accounts over the life of the accounts using an activity based pricing model is provided which comprises the steps of generating at least one of a customer risk rating and a workload rating, allocating at least one of a customer risk expense, a workload expense, an underwriting expense and a reserve amount and analyzing quality of the portfolio.

In a further aspect, a computer-readable medium is provided which comprises a record of workload drivers for a portfolio, a record of trigger levels for each workload driver, and a plurality of rules for matching workload drivers and trigger levels to one or more loan portfolios.

In another aspect, an apparatus comprising means for prompting a user to enter at least one of a customer risk rating and a workload rating, means for allocating at least one of a customer risk expense, a workload expense, an underwriting expense and a reserve amount, and means for analyzing quality of the portfolio is provided.

Further, a method for determining workloads for a portfolio of deals is provided which comprises the steps of selecting, from an electronic interface, a number of workload drivers for the portfolio, and trigger levels for each of the workload drivers. The method further includes the step of requesting, from the electronic interface, a workload rating for the portfolio.

BRIEF DESCRIPTION OF DRAWINGS

FIG. 6 is a user interface for entering workload drivers into an activity based pricing model.

FIG. 7A is a first portion of an exemplary deal structure user interface. FIG. 7B is a second portion of the exemplary deal structure user interface. FIG. 7C is a third portion of the exemplary deal structure user interface.

FIG. 8A is a first portion of a user interface showing a fully funded-post syndication report. FIG. 8C is a third portion of the user interface showing a fully funded-post syndication report.

FIG. 9A is a first portion of a continuation of the user interface shown in FIGS. 8A–8B, syndication report. FIG. 9B is a second portion of the continuation of the user interface shown in FIGS. 8A–8B.

FIG. 11 is a report based upon inputs of account managers.

FIG. 12A is a first portion of an embodiment of a strategic relationship scorecard. FIG. 12B is a second portion of the embodiment of a strategic relationship scorecard.

DETAILED DESCRIPTION

Set forth below is a description of exemplary methods and systems for facilitating an assessment of profitability of accounts over the life of the accounts. While the methods and systems are sometimes described in the context of loans and loan portfolios, the methods and systems are not limited to practice in connection with only loans and loan portfolios. The methods and systems can be used, for example, in connection with leases, financing and many other different types of financial activity. As used herein, the term "deal" is defined as any transaction that involves at least two parties.

A deal therefore may involve at least one of loans, loan portfolios, leases, financing, and any other financial activity.

Figure 1:
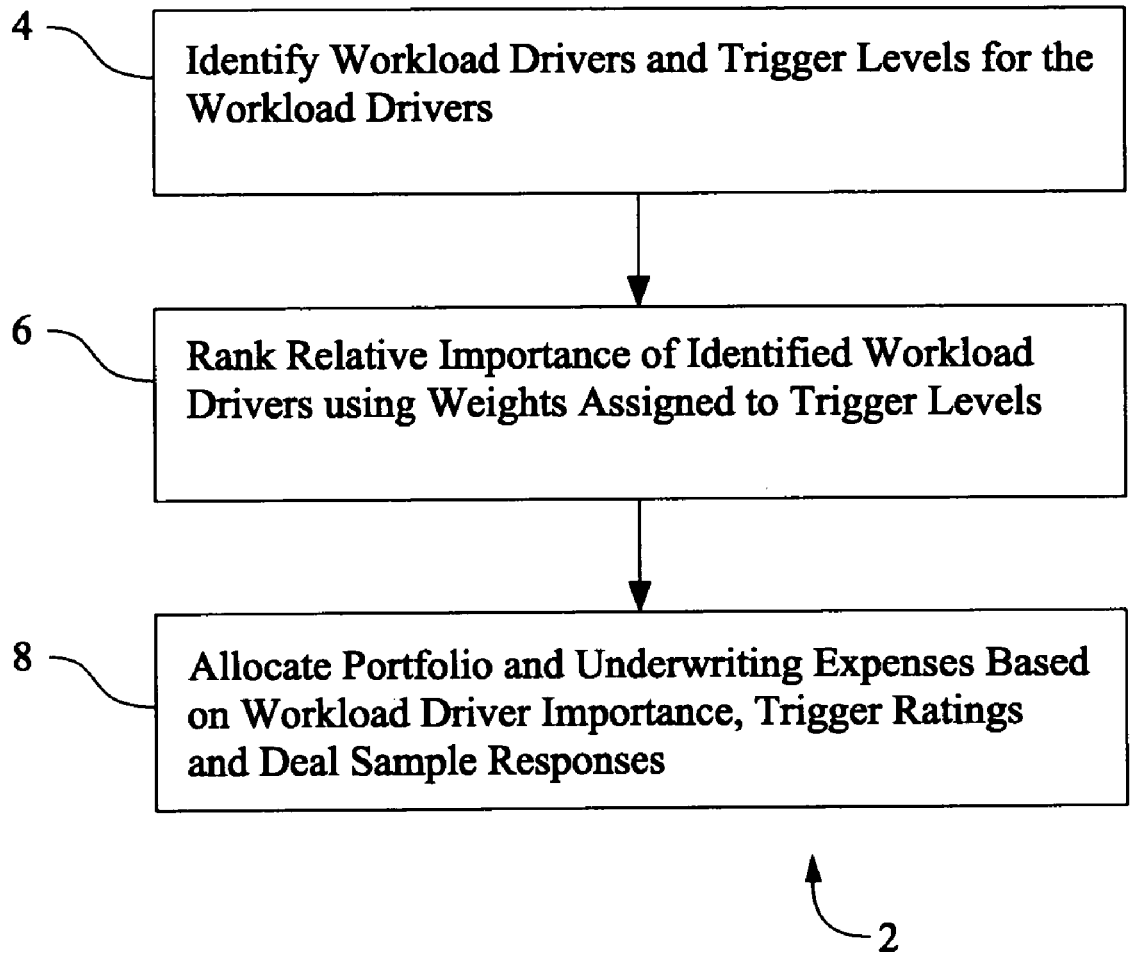
FIG. 1 is flowchart showing steps in using a profitability model.

FIG. 1 is a flowchart 2 illustrating process steps for generating an activity based pricing model, used in an assessment of profitability of an account or a portfolio of accounts. Specifically, and in one exemplary embodiment of such a system, workload drivers and trigger levels for the workload drivers are identified 4. Based on the identified 4 workload drivers and trigger levels, the workload drivers are ranked 6, using assigned weights for the trigger levels for each of the workload drivers. Using the workload drivers, trigger levels and assigned weights for each trigger level for the workload drivers, portfolio and underwriting expenses are allocated 8. Such a process provides an activity based approach for determining costs associated with creation and maintenance of accounts and assists in decision making regarding credit line increases, portfolio rollovers and customer retention. Further, decision making is included regarding new product and market opportunities.

Set forth below are details regarding exemplary hardware architectures (FIGS. 2 and 3), an exemplary process flow chart illustrating processing for enhancing profitability using models (FIG. 4), a data diagram showing flow of workload and related data into a data warehouse (FIG. 5), and exemplary screen shots displayed by the exemplary system to a user desiring to enhance profitability of a portfolio (FIGS. 6 12). Although specific exemplary embodiments of methods and systems for determining profitability and increasing profitability are described herein, the methods and systems are not limited to such specific exemplary embodiments.

Hardware Architecture

Figure 2:
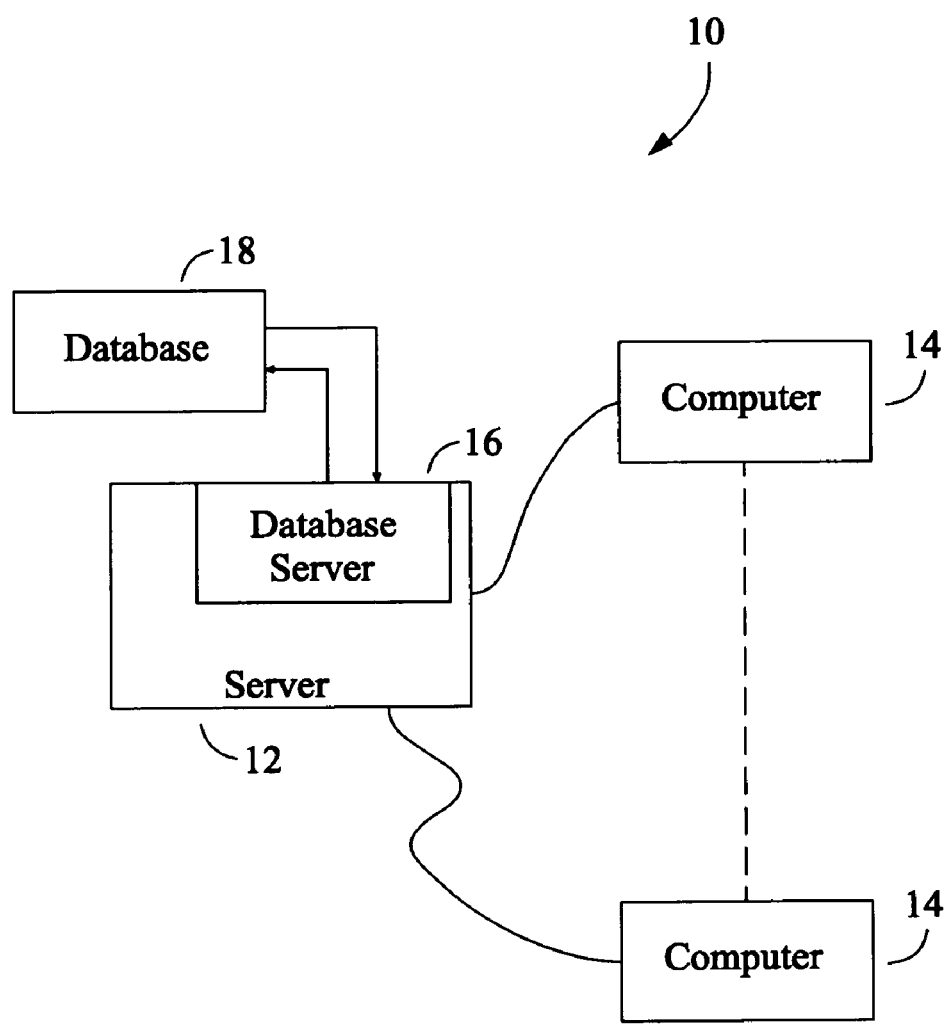
FIG. 2 is a simplified system diagram.

FIG. 2 is a block diagram of a system 10 that includes a server sub-system 12, sometimes referred to herein as server 12, and a plurality of customer devices 14 connected to server 12. In one embodiment, devices 14 are computers including a web browser, and server 12 is accessible to devices 14 via a network such as an intranet or a wide area network such as the Internet. In an alternative embodiment, devices 14 are servers for a network of customer devices.

Devices 14 are interconnected to the network, such as a local area network (LAN) or a wide area network (WAN), through many interfaces including dial-in-connections, cable modems and high-speed lines. Alternatively, devices 14 are any device capable of interconnecting to a network including a web-based phone or other web-based connectable equipment. Server 12 includes a database server 16 connected to a centralized database 18. In one embodiment, centralized database 18 is stored on database server 16 and is accessed by potential customers at one of customer devices 14 by logging onto server sub-system 12 through one of customer devices 14. In an alternative embodiment centralized database 18 is stored remotely from server 12.

Figure 3:
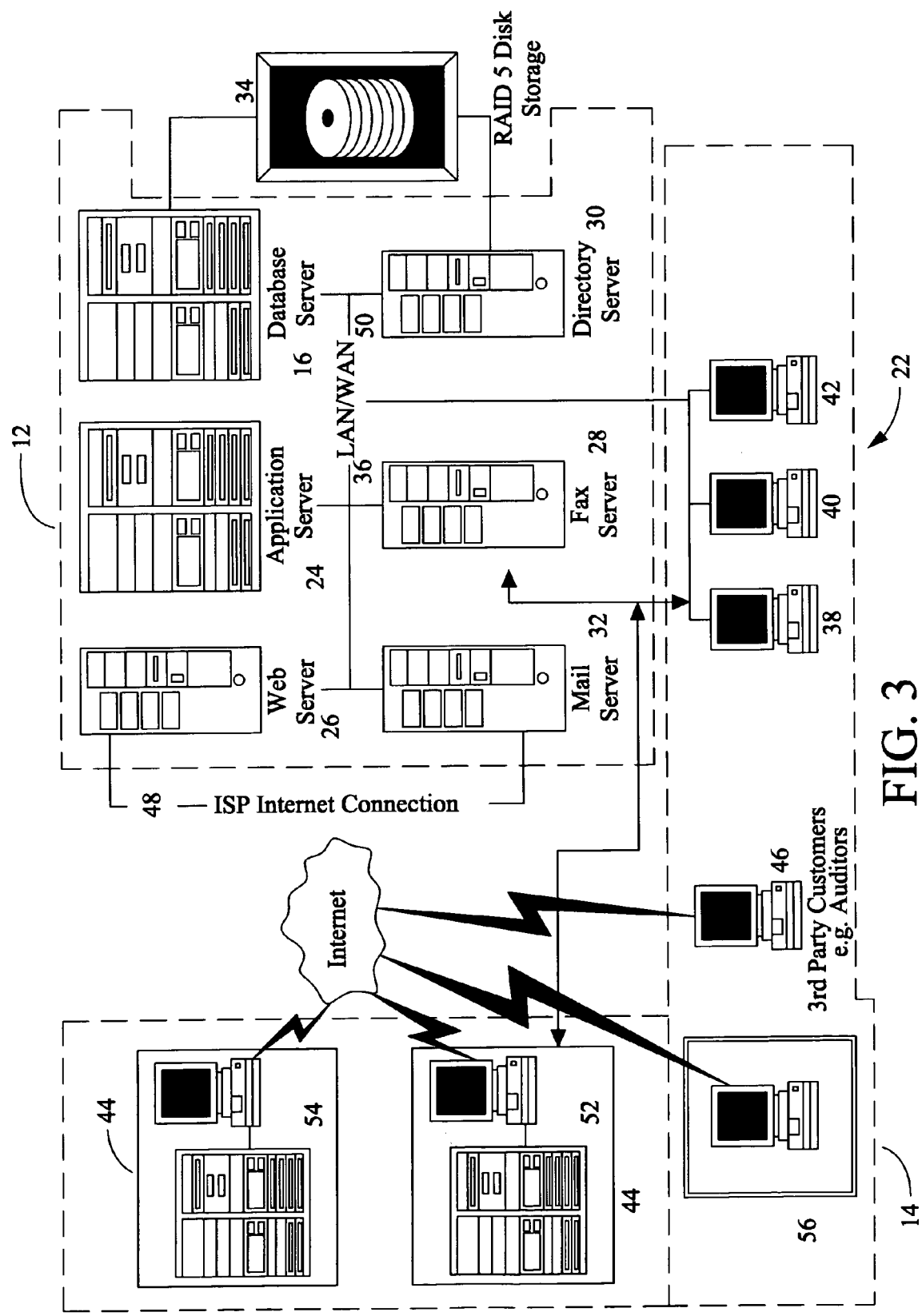
FIG. 3 is a system diagram of a network-based system.

FIG. 3 is a block diagram of a network based system 22. System 22 includes server sub-system 12 and customer devices 14. Server sub-system 12 includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator work station 38, a work station 40, and a supervisor work station 42 are coupled to LAN 36. Alternatively, work stations 38, 40, and 42 are coupled to LAN 36 via an Internet link or are connected through an intranet.

Each work station 38, 40, and 42 is a personal computer including a web browser. Although the functions performed at the work stations typically are illustrated as being performed at respective work stations 38, 40, and 42, such functions can be performed at one of many personal computers coupled to LAN 36. Work stations 38, 40, and 42 are illustrated as being associated with separate functions only to facilitate an understanding of the different types of functions that can be performed by individuals having access to LAN 36.

Server sub-system 12 is configured to be communicatively coupled to various individuals or employees 44 and to third parties, e.g., customer, 46 via an ISP Internet connection 48. The communication in the exemplary embodiment is illustrated as being performed via the Internet, however, any other wide area network (WAN) type communication can be utilized in other embodiments, i.e., the systems and processes are not limited to being practiced via the Internet. In addition, and rather than a WAN 50, local area network 36 could be used in place of WAN 50.

In the exemplary embodiment, any employee 44 or customer 46 having a work station 52 can access server sub-system 12. One of customer devices 14 includes a work station 54 located at a remote location. Work stations 52 and 54 are personal computers including a web browser. Also, work stations 52 and 54 are configured to communicate with server sub-system 12. Furthermore, fax server 28 communicates with employees 44 and customers 46 located outside the business entity and any of the remotely located customer systems, including a customer system 56 via a telephone link. Fax server 28 is configured to communicate with other work stations 38, 40, and 42 as well.

Figure 4:
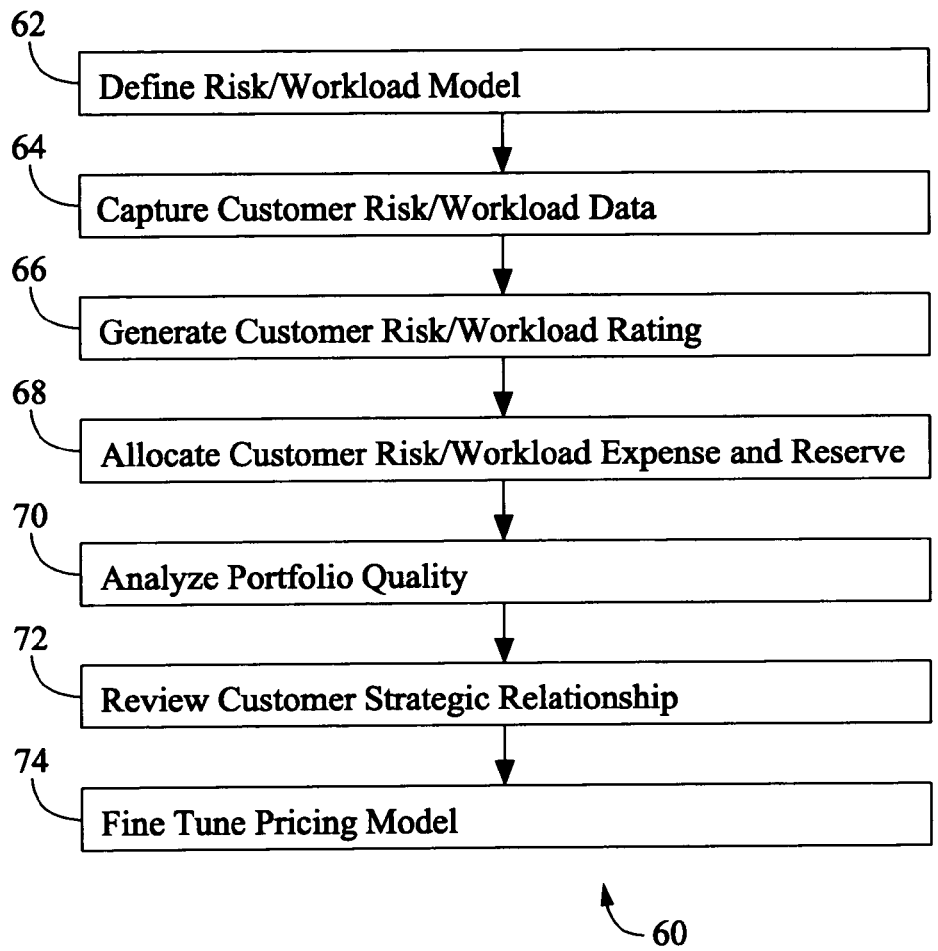
FIG. 4 is a flowchart showing integration of activity based pricing into an overall profitability model.

FIG. 4 is a flowchart 60 of a process integrating an activity based pricing model into a customer profitability model. First, customer risk and activity workload are defined 62 using the pricing model. Then customer risk and activity workload are captured 64 as inputs to the pricing model (described below). Customer risk and workload ratings are generated 66, leading to an allocation 68 for expenses and reserves, based upon the customer risk and workload.

Allocation 68 is accomplished by loading actual data such as pricing and risk rates into a database, for example database 18 (shown in FIG. 1), the pricing model allocates expenses and reserves based upon the data in database 18, the allocations are then stored in a data warehouse (described below), which may be part of database 18, or may be stored in a different location. Storing allocations creates analysis capabilities for future transactions, based on, for example, but not limited to, company sales size, products, business segment, state, originator, underwriter, account manager, industry, credit rating, deal size, financing need and workload. Analysis may be ad-hoc or may be reports at intervals, set or variable. After allocation 68, a portfolio is analyzed 70 for quality, in one embodiment, profitability, leading to reviews 72 of strategic customer relationships and fine-tuning 74 of the pricing model.

Activity Based Pricing Model

Figure 5:
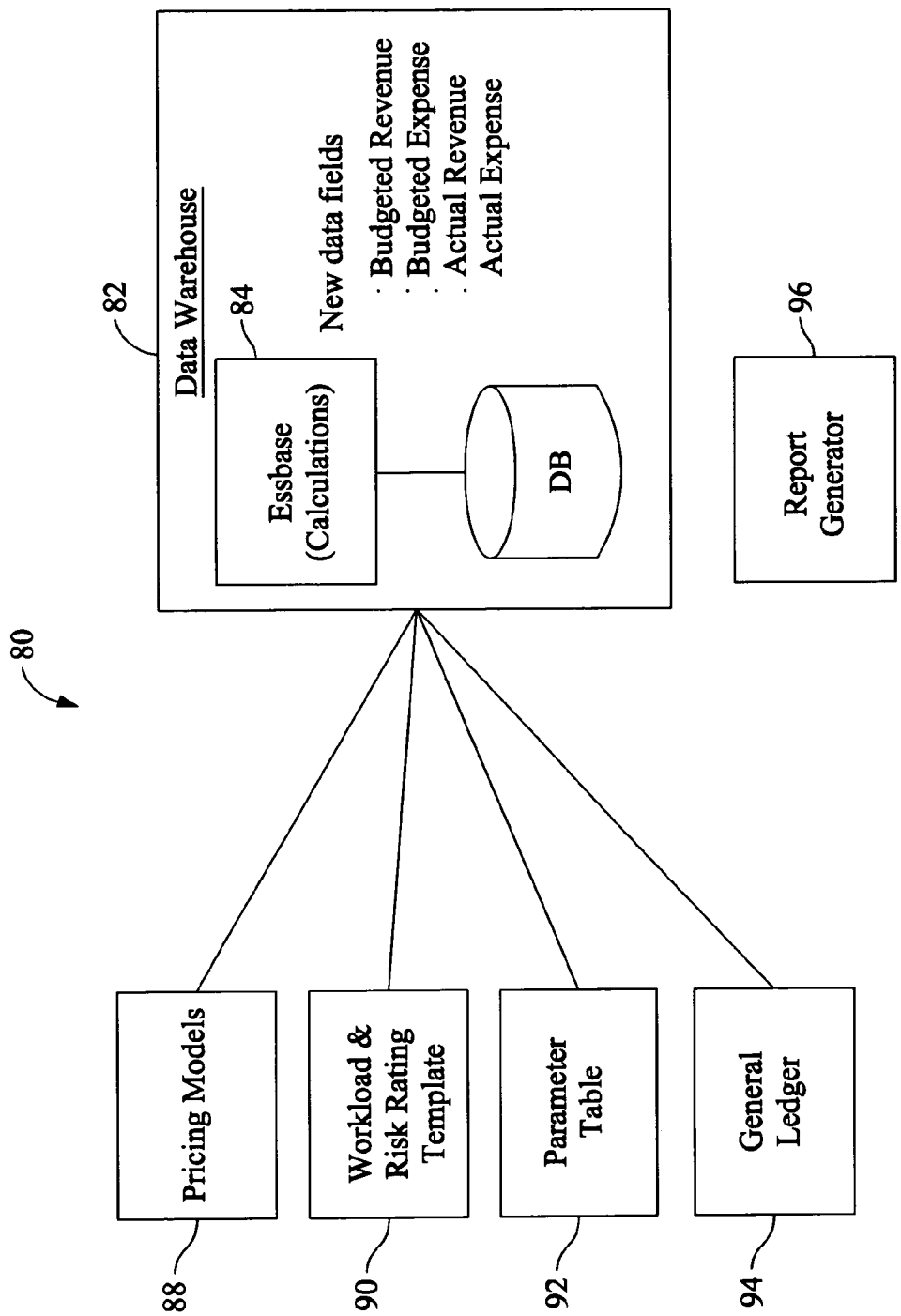
FIG. 5 is a data diagram showing sources of data used to implement an activity based pricing model.

FIG. 5 is a data diagram 80 showing sources of data to implement an activity based pricing model. The gathered data is stored within a data warehouse 82 where a calculation engine 84 which implements the model uses the gathered data, to determine a profitability for a data set. Data and calculations regarding profitability and account performance are stored in database 18. Data is gathering from one or more of a pricing model 88, which includes data regarding budgeted revenues and expenses by customer, data used to estimate actual expenses by customer entered into a workload and rating template 90 (both described below), a parameter table 92 used to calculate actual expenses by customer and a general ledger 94 which includes actual revenues by customer.

While known pricing models use an average cost allocation approach, an activity based pricing model, uses identified, workload drivers, ranked relative to importance against one another. Such a model provides users with a tool that strengthens their ability to evaluate deal economics which are driven by workload requirements, and results in improved information used to make approval decisions on transactions. In addition, closed deal reporting is improved by capturing data faster and more accurately, which results in feedback providing value added pricing trend analysis.

In one embodiment of the activity based pricing model, there is included within the model, identified sensitivities and triggers on the level of effort for each workload driver, the sensitivities and triggers resulting in low, medium and high deal expense levels. The model allocates portfolio and underwriting expenses based upon a combination of workload driver importance, trigger level ratings and responses from deal samples. To measure and test the models impact on return on investment (ROI), revalidation of trigger ratings ensure appropriate allocation of expenses within the workload driver. Using workload drivers transitions deal expenses from an average cost allocation to a per unit allocation at workload driver level.

In one embodiment, identified workload drivers entered into the model through template 90, include, but are not limited to collateral performance, excess availability, books and records, risk classification, number of agings, frequency of borrowing, frequency of reporting, co-borrower structure, fixed charge coverage, first time asset based lending borrower and export-import bank guarantee.

In the same embodiment, the workload drivers collateral performance and books and records include trigger ratings of strong, moderate and weak. An excess availability workload driver has trigger ratings of >25%, >5% and <5%. A risk classification workload driver includes trigger ratings of performing, moderate and watch. A trigger rating based on the number of agings is either equal to one, or is greater than one. The workload drivers frequency of borrowing and frequency of reporting have trigger ratings of monthly, weekly and daily. A fixed charge trigger rating is one of greater than 1.0x, less than 1.0x or less than 0.0x, where x is a fixed coverage charge. The workload drivers co-borrower structure, first time asset based lending borrower, and export-import bank guarantee have trigger ratings of "yes" or "no".

Effectiveness of the model, measured by return on investment (ROI), is impacted by deal size. Since there are fixed expenses associated with every deal, there is little flexibility, in smaller deals, to set pricing of the deal based upon activities. The higher expense structure associated with large deals, allows the activity based pricing model perform, based upon the workload drivers, and therefore increase return on investment. It is seen that impact on ROI is highly dependent on a workload, or level of effort, per deal. ROI is impacted because, as deal size increases, the expense to average net income ratio decreases. That is, the same amount of fixed expense is spread over more investment, reducing the expense impact on ROI. However, ROI is also impacted when income and the fees related to the investment move in tandem. Examples include, but are not limited to, closing fees, annual fees, and collection day fees.

In addition, parameter table 92 provides an interface tool where a financing department sets universally used variables for the profitability model. For example, in one embodiment, percentage allocations are set for origination cost, underwriting cost and overhead. Historic values are also tracked to determine a reserve percentage needed and if an account manager's costs are relatively high, standard or low.

As stated above, fields exist in warehouse 82 for both budgeted and actual data elements associated with deals. Examples of the data stored within warehouse 82 include, in one embodiment, customer contributed value, expenses, reserves, taxes, net income, adjusted average net income and return on investment. In another embodiment, expenses are subdivided into origination, underwriting, account management and overhead. Budgeted expense values are calculated, in one embodiment, using the pricing model. Actual expenses (account management expenses) are described below. Origination expense is calculated, in one embodiment, as a commitment amount, preferably from the pricing model, multiplied by an origination cost allocation percentage. Origination expense is assessed one time and allocated in the month a deal closes. Similarly, underwriting expense is calculated, in one embodiment, as a commitment amount, preferably from the pricing model, multiplied by an underwriting cost allocation percentage and is also allocated in the month the deal closes.

Account management expenses are assessed each month and the amount is determined, in one embodiment, by matching customer workload rating, low, medium or high, assigned by the account manager, with a dollar value from parameters table 92 (shown in FIG. 5). Overhead expenses are assessed each month during the deal and are calculated, in one embodiment as a monthly average net income multiplied by an overhead cost allocation percentage.

Reserves are usually a percentage of loan value. In one embodiment, a reserve percentage is one-eighth of loan value. The reserves value is updated throughout the life of the deal, requiring monthly updates. For example, a multiplication of loan balance and reserve percentage yields a target figure for the reserves amount. Subtracting the reserves amount from the previous months reserves amount indicates the change, up or down, needed, to be at a proper reserves level for the current month. Reserves are calculated, in one embodiment, based upon key criteria identified for risk and workload and the relative impact of each workload driver, based upon a risk/workload matrix.

An average adjusted average net income is calculated, in one embodiment, by summing all monthly average net income values and dividing by a count of the number of monthly average net income values plus one. Return on Investment (ROI) is, in one embodiment, calculated two ways as either a life-to-date ROI or as an annualized ROI. Life-to-date ROI is calculated, in one embodiment, as a summation of net income divided by a life-to-date average net income value. Annualized ROI is calculated, in one embodiment, as a summation of the net income, divided by a life-to-date average net income value, the result multiplied by a factor of 12 and divided by a number of months the deal has been in place.

FIG. 6 is an exemplary embodiment of a user interface 100, based upon template 90 (shown in FIG. 5), for entering workload drivers into the activity based pricing model. In one exemplary embodiment shown, user interface 100 includes pull down menus for entering answers to the workload drivers that are implemented in a particular embodiment of the activity based pricing model. In another embodiment, system 10 (shown in FIG. 2), is configured to prompt a user to select an answer to each of the workload drivers. In such an embodiment, system 10 will not activate the model without an answer for each of the questions having been entered. Other fields included within user interface 100 provide information on whether the deal incorporates cross-selling related expenses, if the deal is a referral deal, and if a referral deal, whether the referral came from inside or outside of the lender company.

In a further embodiment, user interface 100 includes fields for entering a deal name, the region where the deal is taking place, information on the deal team and deal origination data. In addition, user interface includes a selection to identify whether the deal is a portfolio rollover, since if the deal is a rollover, an origination expense is removed. Entries into user interface 100 are used to feed data into other user interfaces, for example, a deal structure user interface.

FIG. 7 is an exemplary embodiment of a deal structure user interface 120. Data entered into user interface 120 is fed into other user interfaces and includes data entered into user interface 100 (shown in FIG. 6). User interface 120 includes data regarding fees, average outstanding balances, amortization schedule and outplacement assumptions, including a fee rake and a rate skim. Also included in user interface 120 are entries denoting various rates in place at time of the data entry, for example, the U.S. prime lending rate, U.S. treasury note rate, the Canadian prime lending rate, a commercial paper rate and a London interbank overnight rate.

Figure 8B:
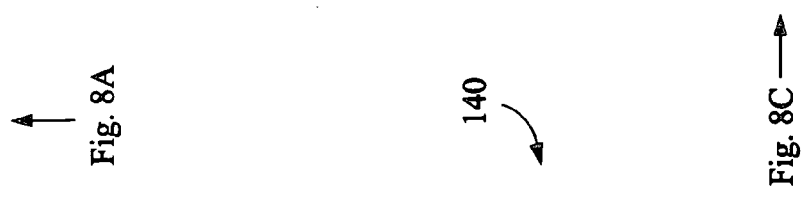
FIG. 8B is a second portion of the user interface showing a fully funded-post syndication report.

FIG. 8 is an exemplary embodiment of a user interface 140 of a report generated by system 10 based upon the information entered into user interfaces 100 (shown in FIG. 6) and 120 (shown in FIG. 7). The report is described as a fully funded—post syndication report and includes the information as entered into the user interfaces as described above, including, deal information, various rates, fees, an average outstanding, an amortization schedule, alternate pricing assumptions, and outplacement assumptions. FIG. 9 is a continuation user interface 160 of user interface 140 described in FIG. 8. Included in continuation user interface 160 is a deal summary over a number of years of the life of the deal and includes, balances, income, fees collected, money cost, contributed value and operating expenses, which are used to determine total expenses, pre-tax income, taxes, net income and cash flows.

FIGS. 8 and 9 are described as a fully funded post syndication report. Although not shown in the Figures, in one embodiment, there exists a similar report, described as an expected case—post syndication report, which is an estimation of the future of the deal's performance.

As stated above, pricing models 88 (shown in FIG. 5) are used to feed budgeted expenses and revenue values into warehouse 82 (shown in FIG. 5), necessitating fields within warehouse 82 to store pricing model data and development of models and interfaces for the exportation of the data to warehouse 82. The models developed for such a task, serve a secondary purpose, that is, the models for exportation of data to warehouse 82, provide users with a common interface and facilitate entry of data in a consistent manner.

Figure 10:
FIG. 10 is a user interface showing an account manager's workload time allocation over multiple accounts.

FIG. 10 is an example user interface 200, where an account manager enters workload and risk ratings for all of their accounts to assign workload and risk ratings for those accounts. By entering information for all of their accounts an account manager is able to determine their total workload allocation based upon all the accounts. As shown in user interface 200, for each account, the account manager is able to enter information on collateral monitoring workload, including frequency of reporting, frequency of borrowing, number of agings, co-borrower structure and number of inventory locations. Further, the account manager is able to enter data on workload due to customer requests, including, asset based lending experience, monthly time required for account strategy and a number of workarounds, amendments and modifications (WAMs). In addition the account manager can enter risk information for each account, such as, excess availability, fixed charge coverage, quality of books and records, assessment of management, ease of liquidation and structure. FIG. 11 is a report 220 which can be generated by a user based upon inputs into the user interface 200 by one or more account managers.

Use of the model to allocate and determine, for example, reserve amounts and other deal expenses, also serves to drive strategic relationships. The model is configured, in one embodiment, to determine where customer relationships may be expanded and deepened, if a determined risk so permits. FIG. 12 is a strategic relationship scorecard 240, which serves to improve customer satisfaction rating through focus on high impact quality items, based upon feedback received. In one embodiment, scorecard 240 is reviewed quarterly or semi-annually, by at least one of a region manager, a portfolio manager and an account manager to develop an action plan based upon previous actions and any retention strategies that have been developed. Use of scorecard 240 helps to formalize customer strategy sessions to ensure proactive identification of opportunities to add to a customer relationship and enhance cross selling opportunities.

In another embodiment, of a profitability model, there is implemented as part of a deal structure, a number of collection days as part of the deal. Use of collection days has been shown to increase profitability of deals, including average annualized contributed value, a contributed value percentage and ROI. The model is configured, in one embodiment, to include collection days as part of a deal proposal, since collection day do not impact borrower availability, since the collection day funds are immediately credited, for the purposes of calculating availability.

Use of a profitability model, such as described herein, provides insight to where an entity should and should not give when pricing a transaction, and further will provide information to the entity on fee collections on an account by account basis, including any variance around collecting fees and waiver of those fees, with which an account manager can be held responsible. Information is further provided, from the model, regarding management of risk and return, including reserve levels and various management reports. Use of the model provides an insight into the profitability of an account when contemplating the resigning of a customer to a new account. The insight is gained since the model provides an understanding on how credit changes over the life of the loan and can better correlate risk around pricing.

The activity based profitability model is configured to allow an entity to better manage deals based on profitability, which in turn becomes part of a management strategy around account profitability. Other long-term benefits of the activity based profitability model include providing information to build referral channels, isolate problems and opportunities by deal, see trends on pricing around events, understand effects of different types of financing on profitability, break out sources of revenue and provide information on any impact of credit line increases on profitability.

While the invention has been described in terms of various specific embodiments, those skilled in the art will recognize that the invention can be practiced with modification within the spirit and scope of the claims.

The invention claimed is:

1. A database for evaluating economics of a financing based on workload requirements, the financing includes at least one loan included within a portfolio of loans requested by a borrower from a lender, said database comprising:
- data corresponding to workload drivers for a financing, each workload driver is an element of the financing relating to the borrower including at least one of collateral performance, excess availability, books and records, risk classification, number of agings, frequency of borrowing, frequency of reporting, co-borrower structure, fixed charge coverage, first time asset based lending borrower and export-import bank guarantee, each workload driver is reviewed by the lender as part of an underwriting process of the financing;
- data corresponding to a trigger level for each workload driver, the trigger level assigned to a workload driver indicates the anticipated level of effort required by the lender to complete the underwriting process associated with the corresponding workload driver; and
- data corresponding to a weight entered by the lender for each trigger level; and
- data corresponding to allocation of portfolio and underwriting expenses, the allocation is based upon the workload drivers and the corresponding trigger levels.

2. A database according to claim 1 wherein the trigger levels for the workload drivers collateral performance and books and records comprise at least one of a first trigger level, a second trigger level, and a third trigger level, the first trigger level indicates less of an anticipated level of effort to complete the underwriting process as compared to the second trigger level, the second trigger level indicates less of an anticipated level of effort to complete the underwriting process as compared to the third trigger level.

3. A database according to claim 1 wherein the trigger levels for the workload drivers frequency of borrowing and frequency of reporting comprise at least one of monthly, weekly and daily.

4. A database according to claim 1 wherein the trigger levels for the workload driver excess availability comprise at least one of a>25% trigger level, a >5% trigger level, and a >5% trigger level.

5. A database according to claim 1 wherein the trigger levels for the workload drivers co-borrower structure, first time asset based lending borrower and export-import Bank guarantee comprise yes and no.

6. A database according to claim 1 wherein the trigger levels for the workload driver risk classification comprise at least one of a performing trigger level, an intermediate trigger level, and a watch trigger level, the performing trigger level indicates less of an anticipated level of effort to complete the underwriting process as compared to the intermediate trigger level, the intermediate trigger level indicates less of an anticipated level of effort to complete the underwriting process as compared to the watch trigger level.

7. A database according to claim 1 wherein the trigger levels for the workload driver number of agings comprise at least one of one and greater than one.

8. A database according to claim 1 wherein the trigger levels for the workload driver fixed charge coverage comprise at least one of a greater than 1.0x trigger level, a less than 1.0x trigger level, and a less than 0.0x trigger level, where x is a fixed charge coverage.

9. A database according to claim 1 wherein said data corresponding to trigger levels for a workload driver comprise data corresponding to a weighting factor for assigning a weight to be given each workload driver within the financing.

10. A system for evaluating economics of a financing based on workload requirements, the financing includes at least one loan included within a portfolio of loans requested by a borrower from a lender, said system comprising:
- a database comprising data corresponding to workload drivers and related trigger levels for the financing, each workload driver is an element of the financing relating to the borrower including at least one of collateral performance, excess availability, books and records, risk classification, number of agings, frequency of borrowing, frequency of reporting, co-borrower structure, fixed charge coverage, first time asset based lending borrower and export-import bank guarantee, each workload driver is reviewed by the lender as part of an underwriting process of the financing, the trigger level assigned to a workload driver indicates the anticipated level of effort required by the lender to complete the underwriting process associated with the related workload driver; and
- a server in communication with the database, said server configured to;
  - prompt the lender to designate at least one workload driver for the financing,
  - prompt the lender to select trigger levels for each designated workload driver when entering data for the financing, and
  - allocate portfolio and underwriting expenses based upon the designated workload drivers and the corresponding trigger levels.

11. A system according to claim 10 wherein said database comprises data corresponding to a weighting factor for the trigger levels corresponding to a workload driver, the weighting factor used to assign a weight to be given each workload driver within the financing.

12. A system according to claim 10 wherein said server is configured to cause a screen listing a plurality of workload drivers for a financing to be displayed at a client computer.

13. A system according to claim 10 wherein for a workload driver, said server causes said client computer to display trigger level selections for each workload driver.

14. A system according to claim 10 wherein said database comprises data corresponding to input and feedback regarding the financing.

15. A system according to claim 10 wherein said server is further configured to allocate portfolio expenses based upon a combination of workload drivers, weights assigned to selected trigger levels and feedback regarding the financing.

16. A system according to claim 15 wherein said server is further configured to allocate portfolio expenses as at least one of origination expenses, underwriting expenses, account management expenses, and overhead expenses.

17. A system according to claim 16 wherein said server is further configured to determine account management expenses based on a customer workload rating.

18. A system according to claim 10 wherein said server is further configured to calculate a reserves amount for each month of the financing, the reserves amount based upon a loan balance and a reserves percentage.

19. A system according to claim 18 wherein said server is further configured to calculate a reserves amount based upon identified risks and workload, the impact of workload based upon a risk/workload matrix.

20. A computer program embodied on a computer-readable medium for evaluating economics of a financing based on workload requirements, the financing includes at least one loan included within a loan portfolio requested by a borrower from a lender, said program comprising a code segment that receives information relating to the loan portfolio and then:

prompts the lender to select workload drivers for the loan portfolio, each workload driver is an element of the financing relating to the borrower including at least one of collateral performance, excess availability, books and records, risk classification, number of agings, frequency of borrowing, frequency of reporting, co-borrower structure, fixed charge coverage, first time asset based lending borrower and export-import bank guarantee, each workload driver is reviewed by the lender as part of an underwriting process of the financing;

prompts the lender to select trigger levels for each workload driver, each trigger level assigned to a workload driver indicates the anticipated level of effort required by the lender to complete the underwriting process associated with the corresponding workload driver; and allocates portfolio and underwriting expenses based upon the workload drivers and the corresponding trigger levels.

21. A computer program according to claim 20 further comprising a record of weighting factors applied to the trigger levels for each workload driver.

22. A computer program according to claim 20 further comprising a record of expenses for the portfolio.

23. A computer program according to claim 22 further comprising a record identifying if the portfolio is a rollover portfolio.

24. A computer program according to claim 20 further comprising a record including at least one of fees, average outstanding balances, amortization schedule, and outplacement assumptions including fee rake and rate skim.

25. A computer program according to claim 20 wherein the loan portfolio is part of a financing, further comprising a record of a financing summary, including at least one of balances, income fees collected, money cost, contributed value and operating expenses, over the life of the financing.

26. A computer program according to claim 20 further comprising a record of collection days allocated for a portfolio.

* * * * *